United States Patent
Arya

(10) Patent No.: US 7,072,144 B2
(45) Date of Patent: Jul. 4, 2006

(54) DAMPING OF VERTICAL AND OFFTRACK DYNAMIC MODES GAIN AT THE SLIDER IN A DISC DRIVE

(75) Inventor: Satya Prakash Arya, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 436 days.

(21) Appl. No.: 10/140,494

(22) Filed: May 7, 2002

(65) Prior Publication Data

US 2003/0210499 A1    Nov. 13, 2003

(51) Int. Cl.
*G11B 5/48* (2006.01)
*G11B 21/16* (2006.01)

(52) U.S. Cl. .................... 360/234.6; 360/245

(58) Field of Classification Search ........... 360/234.6, 360/234.7, 245, 245.1
See application file for complete search history.

(56) References Cited

U.S. PATENT DOCUMENTS

| | | | |
|---|---|---|---|
| 5,079,659 A | | 1/1992 | Hagen |
| 5,530,606 A | * | 6/1996 | Baasch et al. ............ 360/245.6 |
| 5,898,541 A | | 4/1999 | Boutaghou et al. |
| 6,430,006 B1 | * | 8/2002 | Kameyama ............. 360/245.1 |
| 6,493,192 B1 | * | 12/2002 | Crane et al. ............. 360/294.3 |
| 6,549,376 B1 | * | 4/2003 | Scura et al. ............. 360/245.3 |
| 6,594,116 B1 | * | 7/2003 | Ohwe et al. ............. 360/245.1 |
| 6,771,466 B1 | * | 8/2004 | Kasajima et al. ......... 360/234.6 |
| 6,771,467 B1 | * | 8/2004 | Kasajima et al. ......... 360/234.6 |
| 6,775,102 B1 | * | 8/2004 | Kasajima et al. ......... 360/234.6 |
| 6,831,815 B1 | * | 12/2004 | Kasajima et al. ......... 360/294.4 |
| 2001/0021085 A1 | * | 9/2001 | Satoh .................... 360/234.6 |

FOREIGN PATENT DOCUMENTS

| | | |
|---|---|---|
| JP | 54-86118 | 6/1979 |
| JP | 57-110767 | 7/1982 |
| JP | 60-140579 | 7/1985 |
| JP | 61-074184 | 4/1986 |
| JP | 01-211382 | 8/1989 |
| JP | 02-218078 | 8/1990 |
| JP | 02-244468 | 9/1990 |
| JP | 03-012079 | 1/1991 |
| JP | 04-195874 | 7/1992 |
| JP | 11-213589 | 8/1999 |

OTHER PUBLICATIONS

IBM Technical Disclosure Bulletin, "Auxiliary Mass Damping of Disk-File Sliders," vol. 26, No. 6, Nov. 1983, pp. 2922-2923.
IBM Technical Disclosure Bulletin, "PVF2 Resonance Damping for Magnetic Recording," vol. 28, No. 12, May 1986, pp. 5611-5613.
G.F. Grometer, "Magnetic Head Discrete Vibration Damper/Tuner," Research Disclosure, May 1992, No. 337, 1pp.

* cited by examiner

*Primary Examiner*—Brian E. Miller
(74) *Attorney, Agent, or Firm*—Zilka-Kotab, PC

(57) ABSTRACT

The invention discloses an apparatus and method for passive damping of slider modes in a storage device. An exemplary apparatus comprises a cradle for supporting a slider and comprising two side members and a center member, where each of the side members are disposed at opposite ends of the center member, and a viscoelastic layer lining two side members and the center member of the cradle.

22 Claims, 7 Drawing Sheets

DAMPING OF VERTICAL AND OFFTRACK DYNAMIC MODES GAIN AT THE SLIDER IN A DISC DRIVE

BACKGROUND OF THE INVENTION

1. Field of the Invention

The present invention generally relates to disc drive storage devices, and particularly to methods and systems for damping modes of a disc drive head to improve performance.

2. Description of Related Art

Current mass storage devices, such as hard disc drives, have been developed to operate with the disc storage media rotating at very high speeds. The read/write head must be precisely and accurately controlled above the spinning media. Typically, the head is held in a slider which "flies" on a very thin air gap above the high speed spinning media.

Precise and accurate control of the head is important in improving the recording density of the storage device. Stabilizing the slider directly affects control of the head. As vibration is known to diminish the stability of the slider, there is a need for apparatuses and methods for minimizing slider vibration in storage devices. Although active vibration control is possible, such techniques are often costly and complex. In addition, previous techniques for passive vibration control have not adequately addressed both vertical as well as offtrack vibration modes. Previously, vibration has been addressed by damping individual suspension component modes, or by moving dynamic frequencies to higher values where they incur a reduced recording density penalty. Such solutions have not adequately isolated the slider from disturbances, however.

Accordingly, there is a need for apparatuses and methods for stabilizing sliders in storage devices. There is further a need for apparatuses and methods for reducing slider vibration using passive damping. Particularly, there is a need for inexpensive techniques for damping both vertical and offtrack slider vibration modes. The present invention meets these needs and is applicable to all storage devices employing sliders.

SUMMARY OF THE INVENTION

To overcome the limitations in the prior art described above, and to overcome other limitations that will become apparent upon reading and understanding the present specification, the present invention discloses an apparatus and method for passive damping of slider modes in a storage device.

An exemplary apparatus of the present invention comprises a cradle for supporting a slider and comprising two side members and a center member, where each of the side members are disposed at opposite ends of the center member, and a viscoelastic material lining the two side members and the center member of the cradle. In some embodiments of the invention, the side members are decoupled from the center member. Alternately, the side members can be coupled to the center member.

In some embodiments, the viscoelastic material can be made from a single rectangular strip. Generally, the viscoelastic material lining the center member damps offtrack modes of the slider and the viscoelastic material lining the two side members damps vertical modes of the slider. The apparatus can also include a flexure and/or a load beam to support the slider.

Furthermore, the viscoelastic material can be used to support the slider by applying the viscoelastic material to the cradle and placing the slider with the viscoelastic material into the cradle with the applied viscoelastic material. This method is preferred when the flexure comprises the side and center members of the cradle, particularly when the side members are bent ears of the flexure.

Alternately, the viscoelastic material can be used to support the slider by applying the viscoelastic material to the slider and placing the slider with the viscoelastic material into the cradle. This method is preferred when the load beam comprises the side members of the cradle, particularly when the side members are bent ears of the load beam.

In some embodiments, the flexure further supports the slider by stabilizing the cradle while allowing pitch and roll movement and the flexure can include the center member of the cradle. In other embodiments, the flexure can include both the side members and center member of the cradle. The side members of the cradle can be attached to the load beam that further supports the slider.

In further embodiments of the invention, the load beam supports the slider by applying a preload to the slider. The preload can be applied to the center member of the cradle by a dimple on the load beam. In addition, the dimple on the load beam can define a pivot for pitch and roll movement of the slider. In some embodiments, the load beam comprises the side members of the cradle. The center member of the cradle can be attached to the flexure for further supporting the slider.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying figures which form a part hereof, and in which is shown by way of illustration specific embodiments in which the invention may be practiced. It is to be understood that other embodiments may be utilized and structural changes may be made without departing from the scope of the present invention.

Overview

The head stack assembly (HSA) with the help of voice coil motor (VCM) in a typical storage device is designed to position and control a magnetic head in very close proximity to the rotating disc of the drive. A head gimbal assembly (HGA) comprises a mount plate, a load beam and a flexure (or gimbal spring) supporting a slider that holds the head. The load beam supports a slider at a fixed point while the flexure allows spring-reacted motion of the slider about the fixed point. With this support architecture, the slider is made to "fly" on a thin gap of air above the high speed spinning media (e.g. a spinning magnetic disc).

Many features of the HGA design can affect the precision and accuracy in controlling the motion of the slider. Greater precision and accuracy in control of the slider enables an increase in the recording density of the storage device. One factor affecting slider control is vibration and therefore vibration control can improve the recording density.

As recording density is increased, the vibrations of the slider become more significant. These oscillations of the slider must be reduced or eliminated to facilitate improved recording density. Minimizing unwanted vibrations of the slider improves the head stability and reduces the proximity to the disc surface. The head tracks more closely to the center of the data track and thereby ensures more reliable writing and reading of the data stored on the disc.

Hard disc drive actuator components dynamic modes gain influences slider motion. Disc and spindle dynamics also excite slider modes. The present invention passively damps slider vertical and offtrack motion thereby allowing an increase in the recording density on a disc.

The present invention teaches a novel cradle carrier for the slider that is lined with a viscoelastic material. In some embodiments, a suspension flexure or load beam with ears bent upward can be used to incorporate a viscoelastic material film at the sides and bottom of the slider.

As the slider flies over the disc, transmission of dynamic modes disturbances (that can cause slider offtrack and vertical motion), are reduced or eliminated by elastic shearing of the viscoelastic material and the vibration energy dissipated as heat. In addition, dynamic disturbances due to disc and/or spindle motion transferred to slider through direct contact with bumps, are damped by vertical shearing of viscoelastic material on the sides of the slider. Some exemplary embodiments are detailed hereafter.

Slider Vibration Damping Apparatus

Figure 1A:
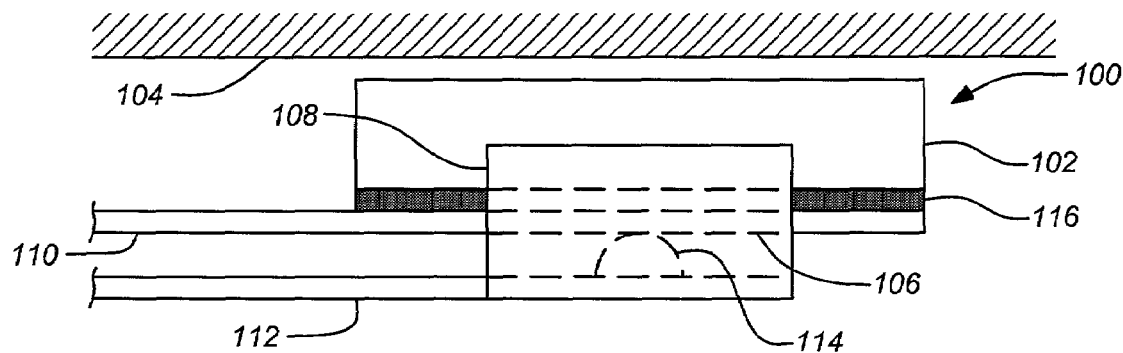
FIGS. 1A–1C illustrate a first embodiment of the invention where the cradle is formed from ears on the beam and the flexure.
Figure 1B:
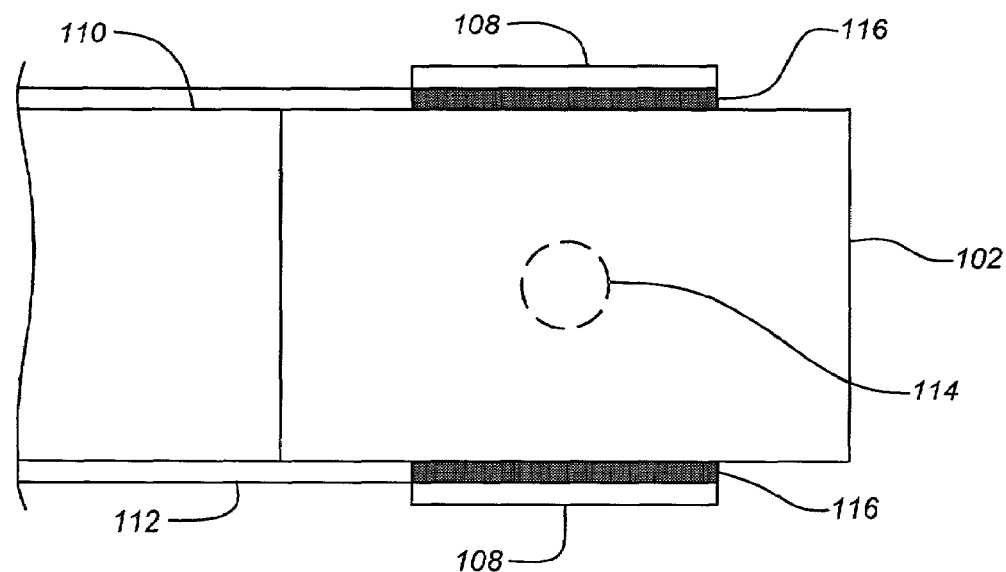
Figure 1C:
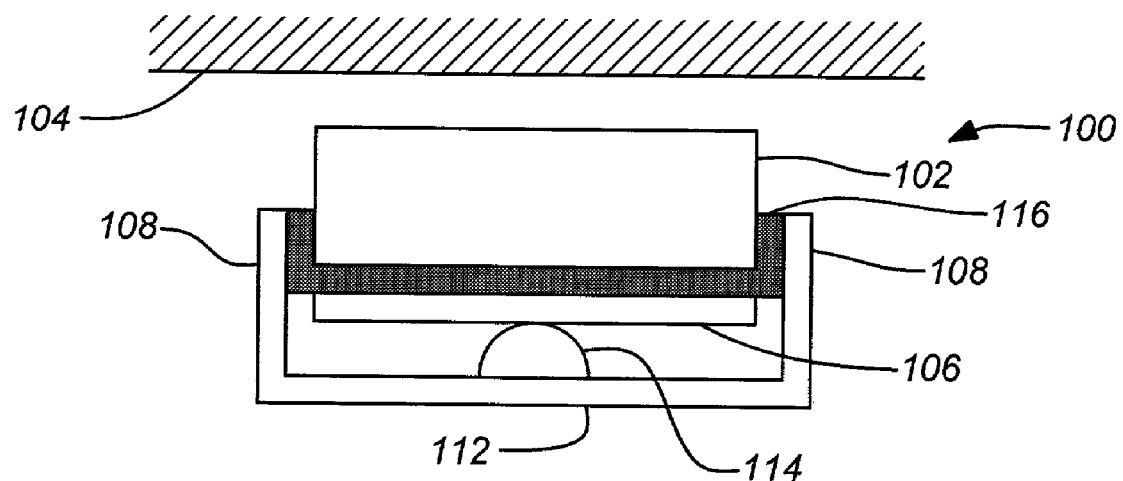

FIGS. 1A–1C illustrate a first exemplary embodiment of the invention where the cradle 100 is formed from ears on the load beam and the flexure. The slider 102 that holds the head (not shown) flies over the high-speed media surface 104 as shown in FIGS. 1A and 1C. In this embodiment, the cradle 100 which supports the slider 102 includes a center member 106 and two side members 108 that are disconnected from each other as is best shown in FIG. 1C. The center member 106 is part of the flexure 110 of the armature. The side members 108 can be formed from the load beam 112. Thus, the side members 108 of the cradle 102 can be cheaply and easily manufactured from bent "ears" of the load beam 112. A dimple 114 can be used to apply the preload of the load beam 112 on the slider 102. In this embodiment, the preload is applied at the center member 106 of the cradle 100.

A unique feature of the embodiment of FIGS. 1A–1C is the decoupled (or weakly coupled) arrangement of the center member 106 and side members 108. Offtrack vibration modes are principally damped by shear between the center member 106 and the cradle 100. Whereas, vertical vibration modes are principally damped by shear between the side members 108 and the cradle 100. The center member 106 and side members 108 are respectively carried by the flexure 110 and load beam 112. Thus, the separate damping modes are only coupled through the viscoelastic layer 116.

The embodiment of FIGS. 1A–1C is also depicted with the preload of the load beam 112 applied to the slider 102 at the bottom of the cradle 100 by a dimple 114. In other embodiments, the dimple 114 can apply the preload directly to the cradle 100, through a hole in the center member 106 for instance. However, such a configuration can reduce the effective vibration damping of the slider 102.

The slider 102 is isolated from excessive vibration, particularly vertical and offtrack modes, by the viscoelastic layer 116 which lines the cradle 100 to support the slider 102. As previously discussed, shearing of the viscoelastic layer 116 and energy dissipated as heat serve to isolate the cradle 100 (and therefore the head) and minimize disturbances. Thus, the head can be controlled with higher precision and yield a greater recording density on the media surface 104.

In some embodiments, the viscoelastic layer 116 can be efficiently and simply constructed from a single continuous strip of viscoelastic layer 116 of uniform width and thickness, however, other configurations are also possible. For example, the viscoelastic layer 116 can be formed with different thicknesses and widths lining the center and vertical members 106, 108 to dampen the respective offtrack and vertical modes. Further, the viscoelastic layer 116 can also be formed from separate pieces lining the center and side members 106, 108. The embodiment of FIGS. 1A–1C is shown with a viscoelastic layer 116 comprising a viscoelastic material of uniform thickness having a wide section lining the center member 106 and a narrower sections lining the side members 108.

Variations in the thickness of the viscoelastic layer 116 can also be used to optimize the dampening characteristics for the offtrack and vertical modes, respectively. Similarly, the cradle 100 itself can be designed with different widths for the center and vertical members 106, 108 to provide a proper contact area for the viscoelastic layer 116.

The composition of the viscoelastic layer 116 can also be varied to adjust the damping performance for the isolated modes. For example, viscoelastic materials having different properties (e.g., stiffness, damping, etc.) can be selected as the viscoelastic layer to line each of the center and side members 106, 108.

Figure 2A:
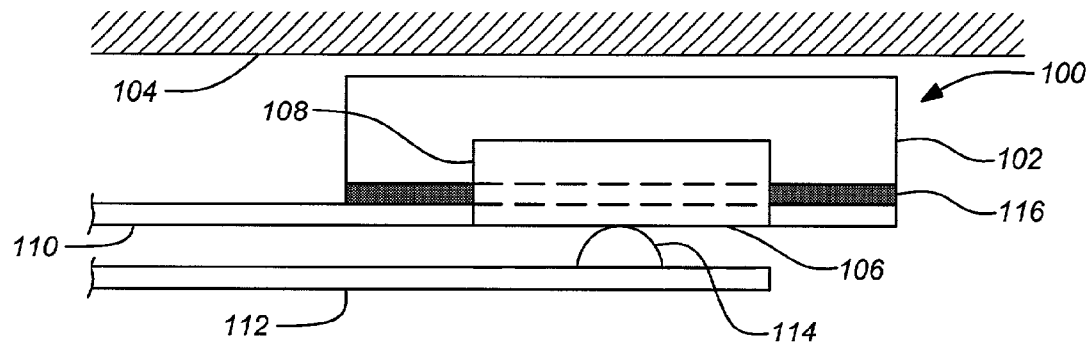
FIGS. 2A–2C illustrate a second embodiment of the invention where the cradle is formed from ears on the flexure.
Figure 2B:
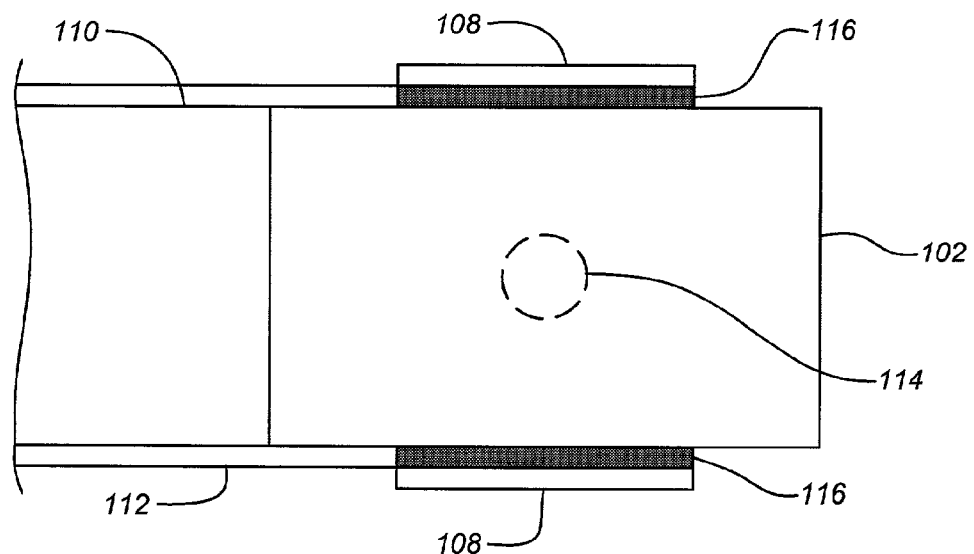
Figure 2C:
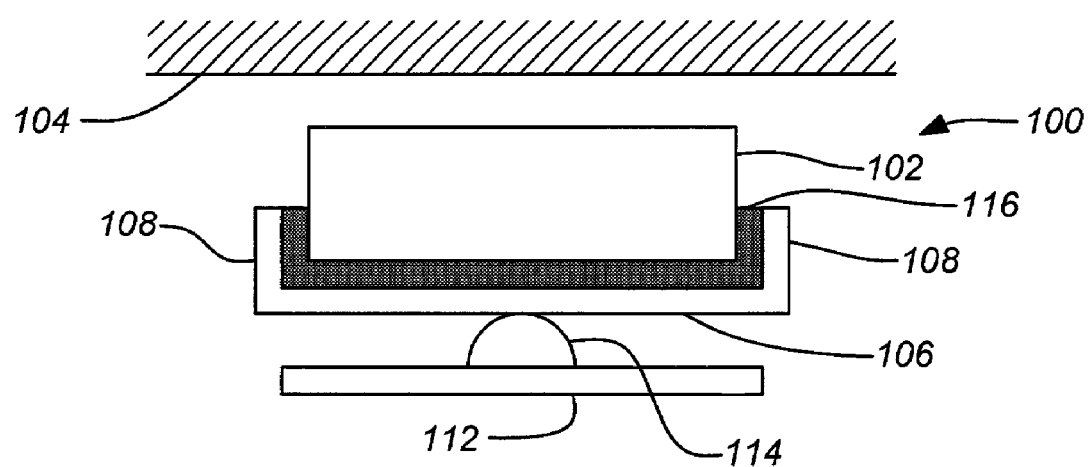

FIGS. 2A–2C illustrate a second exemplary embodiment of the invention where the cradle 100 is formed from ears on the flexure 110. In this embodiment, both the center member 106 and the side members 108 of the cradle 100 are interconnected, as shown in FIG. 2C. The entire cradle 100 structure is part of the flexure 110. Thus, the cradle 100 can be conveniently constructed integral to the flexure 110 with the center member 106 and the two side members 108 are extensions of the end of flexure 110. In this embodiment, the side members 108 can be formed from bent "ears" of the flexure 110.

In this embodiment, vibration damping through the viscoelastic layer 116 is provided between the flexure 110 and the slider 102 elements alone, because the center member 106 from the side members 108 are coupled to each other. The load beam 112 provides support to the flexure 110, which, in turn, carries the slider 102 in the vibration-isolated cradle 100. In this embodiment, the vibration modes are coupled at the flexure 110 before transmission to the cradle 100. Selection and design of the viscoelastic layer 116 and other elements can be similarly varied in the manner previously described respecting the first cradle 100 embodiment (e.g., thickness, composition, etc.).

Methods of Manufacture

Figure 3A:
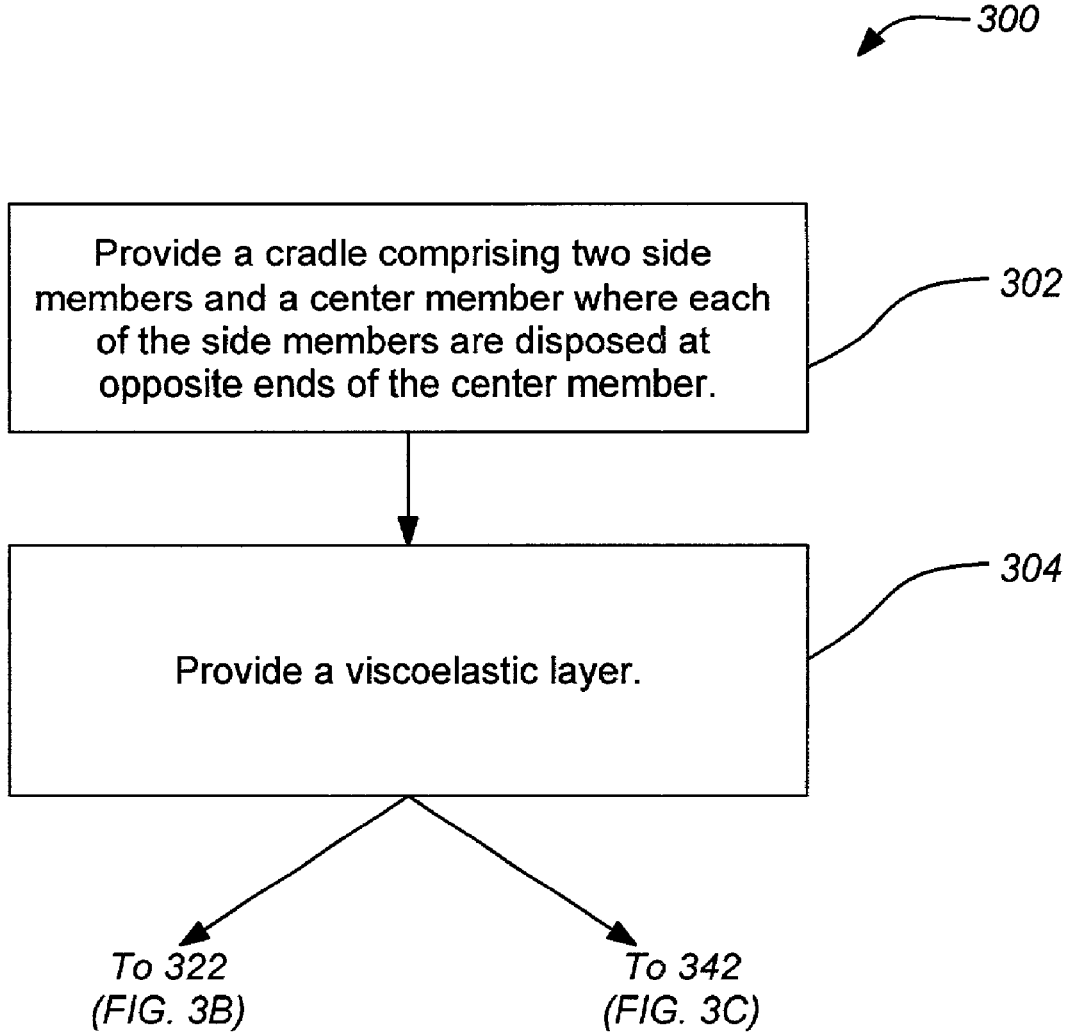
FIG. 3A is a flowchart of the general method for damping vibration.

FIG. 3A is a common flowchart 300 of the general method for assembly of damping vibration components described in the present invention. At block 302, a cradle is provided comprising two side members and a center member where each of the side members are disposed at opposite ends of the center member. At block 304, a viscoelastic layer is provided. Further assembly steps to support a slider on the viscoelastic layer lining the two side members and the center member are shown in first sub-method 320 (FIG. 3B) and second sub-method 340 (FIG. 3C) as described below.

Figure 3B:
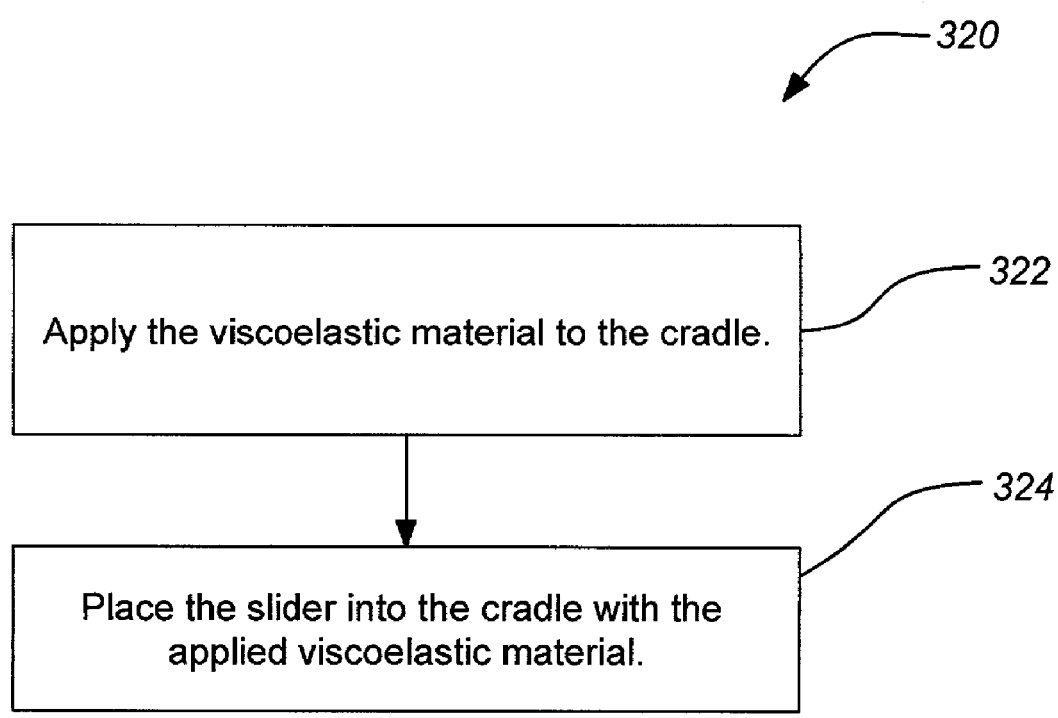
FIG. 3B is a flowchart of a first method of supporting the slider to damp vibration.

FIG. 3B is a flowchart 320 of a first sub-method of supporting the slider with the viscoelastic layer 116. At block 322, the viscoelastic layer 116 is applied to the cradle. Then, at block 324, the slider is placed into the cradle with the viscoelastic layer 116 lining, such as with locating tooling.

The slider can be placed in the cradle using different techniques. In one embodiment the cradle is spread, for example with a tooling fixture. Spreading the cradle involves applying force to temporarily widen the cradle, such that the cradle substantially returns to its original configuration when it is released. For example, the two side members of the cradle can be temporarily forced apart to spread the cradle. After the slider is positioned in the cradle, the spread cradle is released to hold the slider.

In another embodiment, the slider can be positioned in an opened cradle and then a force can be applied to the cradle to squeeze the cradle around the slider. The applied force deforms the cradle slightly to hold the slider. For example, the two side members of the cradle could begin in slightly opened position such that the slider is easily placed and positioned within the cradle. Following this, force is applied to the side members to position the side members closer to the slider sides. When the force is released, the side members retain some permanent set to hold the slider.

The sub-method of FIG. 3B can be particularly useful if cradle is formed with "ears" on the flexure. As described above, a single rectangular strip of viscoelastic film can be installed in flexure "U"-shaped tongue cavity (i.e., the cradle). Then with the aid of locating tooling, and with the ears pulled apart, the slider can be placed in position in the cradle.

Figure 3C:
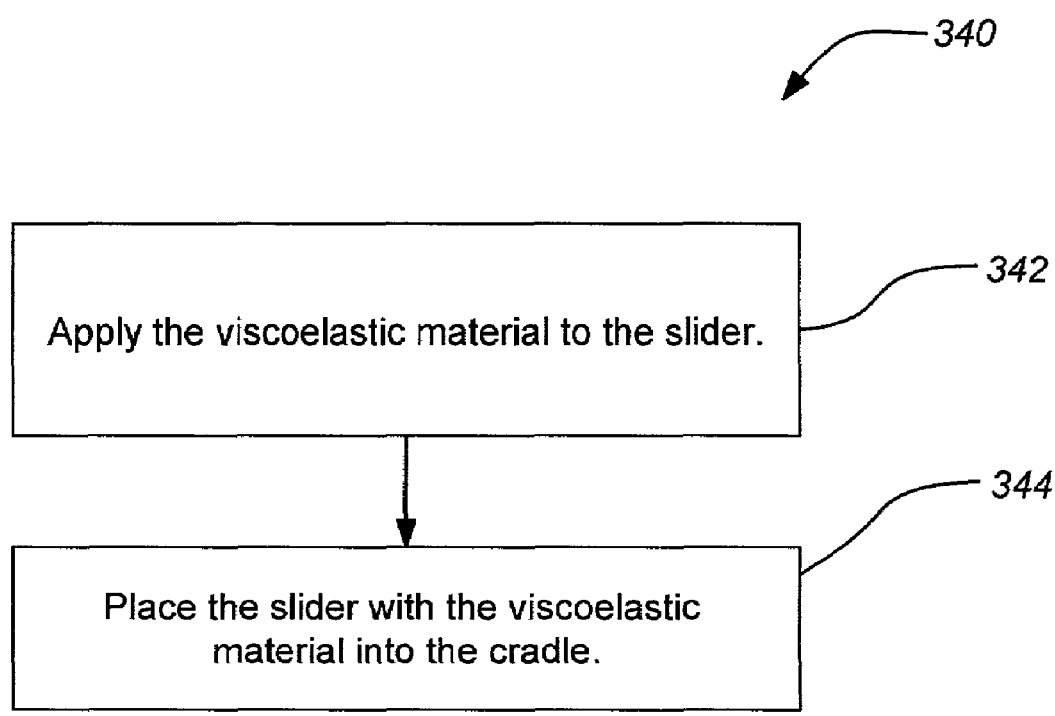
FIG. 3C is a flowchart of a second method of supporting the slider to damp vibration.

FIG. 3C is a flowchart 340 of a second sub-method of supporting the slider with the viscoelastic layer 116. Using this alternate sub-method, the viscoelastic layer 116 is first applied to the slider at block 342. Next, at block 344, the slider with the applied viscoelastic material is placed into the cradle, such as with locating tooling. As described above, the slider can be placed in to the cradle by spreading the cradle.

The sub-method of FIG. 3C is preferred if the cradle is formed from "ears" on a load beam. As described above, a viscoelastic film can be first attached to the flexure top and slides of the slider. Then, with load beam "ears" pulled apart, the slider can be slid down and positioned with the help of fixtures and/or tools.

CONCLUSION

In summary, the present invention comprises an apparatus and method for passive damping of slider modes in a storage device.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for passive damping of slider modes in a storage device, comprising:
   a cradle for supporting a slider and comprising two side members and a center member where each of the side members are disposed at opposite ends of the center member; and
   a viscoelastic layer lining the two side members and the center member of the cradle, wherein the side members are coupled to the center member, wherein the side members are positioned outside a periphery of the slider.

2. The apparatus of claim 1, wherein the side members are decoupled from the center member.

3. The apparatus of claim 1, wherein the viscoelastic layer comprises a single rectangular strip.

4. The apparatus of claim 1, wherein the slider is supported byte viscoelastie material by at least one of(i) applying the viscoelastic layer to the cradle and placing the slider into the cradle with the applied viscoelastic layer and (ii) applying the viscoelastic layer to the slider and placing the slider with the viscoelastic layer into the cradle.

5. The apparatus of claim 1, wherein the side members are positioned outside apposite peripheral sidewalls of the slider.

6. The apparatus of claim 1, wherein the viscoelastic layer lining the center member damps offtracic modes of the slider.

7. The apparatus of claim 1, wherein the viscoelastic layer lining the two side members damps vertical modes of the slider.

8. The apparatus of claim 1, wherein the center member of the cradle is attached to a flexure for further supporting the slider.

9. The apparatus of claim 1, wherein the preload is applied to the center member of the cradle.

10. The apparatus of claim 1, wherein a preload is applied to the center member of the cradle by a dimple on the load beam, wherein the dimple on the load beam defines a pivot for pitch and roll movement of the slider.

11. An apparatus for passive damping of slider modes in a storage device, comprising:
    a cradle for supporting a slider and comprising two side members and a center member where each of the side members are disposed at opposite ends of the center member; and
    a viscoelastic layer lining the two side members and the center member of the cradle,
    wherein the viscoelastic layer lining the center member damps attack modes of the slider, wherein the viscoelastic layer lining the two side members damps vertical modes of the slider, wherein the separate damping modes are only coupled through the viscoelastic layer.

12. A method for passive damping of slider modes in a storage device, comprising:
    providing a cradle comprising two side members and a center member where each of the side members are disposed at opposite ends of the center member;
    providing a viscoelastic layer; and
    supporting the slider in the cradle on the viscoelastic layer lining the two side members and the center member of the cradles, wherein a portion of the viscoelastic layer lining each side member has at least one of (i) a different length and (ii) a different width, than a portion of the viscoelastic layer lining the center member, each side member being separate from the center member.

13. The method of claim 12, wherein the side members are decoupled from the center member.

14. The method of claim 12, wherein the side members are decoupled from the center member.

15. The method of claim 12, wherein the viscoelastic layer comprises a single rectangular strip.

16. The method of claim 12, wherein the step of supporting the slider comprises:
    applying the viscoelastic layer to the cradle; and
    placing the slider into the cradle with the applied viscoelastic layer.

17. The method of claim 12, wherein the step of supporting the slider comprises:
    applying the viscoelastic layer to the slider; and
    placing the slider with the viscoelastic layer into the cradle.

18. The method of claim 12, wherein the viscoelastic layer lining the center member damps offtrack modes of the slider.

19. The method of claim 12, wherein the viscoelastic layer lining the two side members damps vertical modes of the slider.

20. The method of claim 12, wherein the center member of The cradle is attached to a flexure for further supporting The slider.

21. The method of claim 12, wherein the preload is applied to the center member of the cradle.

22. The method of claim 12, wherein a preload is applied to the center member of The cradle by a dimple on the load beam, wherein the dimple on the load bean, defines a pivot for pitch and roll movement of the slider.

* * * * *

UNITED STATES PATENT AND TRADEMARK OFFICE
CERTIFICATE OF CORRECTION

PATENT NO. : 7,072,144 B2  Page 1 of 1
APPLICATION NO. : 10/140494
DATED : July 4, 2006
INVENTOR(S) : Arya It is certified that error appears in the above-identified patent and that said Letters Patent is hereby corrected as shown below:

Col. 6, line 22 change "byte viscoelastie" to --by the viscoelastic--;
Col. 6, line 28 change "apposite" to --opposite--;
Col. 6, line 31 change "offtracic" to --offtrack--;
Col. 6, line 54 change "attack" to --offtrack--;
Col. 6, line 67 change "cradles" to --cradle--;
Col. 8, line 9 change "The" to --the--;
Col. 8, line 10 change "The" to --the--;
Col. 8, line 15 change "The" to --the--;
Col. 8, line 16 change "load bean" to --load beam--.

Signed and Sealed this

Twelfth Day of December, 2006

JON W. DUDAS
*Director of the United States Patent and Trademark Office*